(12) United States Patent
Kaneko

(10) Patent No.: US 6,169,589 B1
(45) Date of Patent: Jan. 2, 2001

(54) COLOR LIQUID CRYSTAL DISPLAY

(75) Inventor: Yasushi Kaneko, Tokorozawa (JP)

(73) Assignee: Citizen Watch Co., Ltd., Tokyo (JP)

(*) Notice: Under 35 U.S.C. 154(b), the term of this patent shall be extended for 0 days.

(21) Appl. No.: 09/324,836

(22) Filed: Jun. 3, 1999

Related U.S. Application Data

(62) Division of application No. 09/096,492, filed on Jun. 12, 1998.

(30) Foreign Application Priority Data

Jun. 13, 1997 (JP) ................................. 9-156787
Jun. 20, 1997 (JP) ................................. 9-164152

(51) Int. Cl.$^7$ ............................................. G02F 1/133
(52) U.S. Cl. ................................... 349/117; 349/181
(58) Field of Search ........................ 349/117, 118, 349/181

(56) References Cited

U.S. PATENT DOCUMENTS

| | | | |
|---|---|---|---|
| 5,061,042 | * 10/1991 | Nakamura et al. | 359/63 |
| 5,493,431 | * 2/1996 | Baba et al. | 359/73 |
| 5,548,426 | * 8/1996 | Miyashita et al. | 359/73 |
| 5,583,678 | * 12/1996 | Nishino et al. | 349/118 |
| 5,715,028 | * 2/1998 | Abileah et al. | 349/117 |
| 5,838,408 | * 11/1998 | Inoue et al. | 349/118 |
| 5,982,463 | * 11/1999 | Yamaguchi et al. | 349/99 |

FOREIGN PATENT DOCUMENTS 7-5457   1/1995 (JP).
8-15691  1/1996 (JP).

* cited by examiner

*Primary Examiner*—Kenneth Parker
(74) *Attorney, Agent, or Firm*—Armstrong, Westerman, Hattori, McLeland & Naughton

(57) ABSTRACT

In a reflection-type color liquid crystal display which can display a bright, high-saturation negative-type color display with a background in black or deep color, a pair of polarizing films 8 and 9 are disposed on both sides of a liquid crystal 20 which has a nematic liquid crystal 7 between a pair of substrates 1 and 4 having electrodes respectively, and a twisted retardation film 10 is disposed between the polarizing films 9 and the liquid crystal device 20. The intersecting angle between absorption axes of the pair of polarizing films 8 and 9 is set to be in the range of 60° to 120°, the Δnd value of the liquid crystal device 20 is set to be in the range of 1500 nm to 1800 nm, and the Δnd value of the twisted retardation film 10 is arranged to be in nearly the same range as the Δnd value of the liquid crystal device 20.

4 Claims, 11 Drawing Sheets

COLOR LIQUID CRYSTAL DISPLAY

This application is a division or prior application Ser. No. 09/096,492 filed Jun. 12, 1998.

BACKGROUND OF THE INVENTION

1. Field of the Invention

This invention relates to a color liquid crystal display, more particularly, to a color liquid crystal display performing color display using birefringence of a liquid crystal device, without using color filters.

2. Description of the Related Art

There are two kinds of color liquid crystal displays, that is, one embodies a color filter and the other performs color display using birefringence of a liquid crystal without using a color filter.

In a liquid crystal display having a color filter therein, since a pixel is composed of three elements of R, G, B, the amount of transmitted light is reduced to around one third and the liquid crystal display usually requires a small fluorescent light as a back light, the liquid crystal display with a color filter is not suitable for a reflection-type color liquid crystal display.

On the other hand, a liquid crystal display which performs color display utilizing birefringence of a liquid crystal is suitable for the reflection-type color liquid crystal display, because color displaying can be performed with one pixel only by changing the voltage applied to a liquid crystal device.

As the color display utilizing the birefringence of the liquid crystal, the followings are known:

(1) A color liquid crystal display composed only of a liquid crystal device and a pair of polarizing films.

(2) A color liquid crystal display composed of a liquid crystal device, a retardation film and a pair of polarizing films.

(3) A color liquid crystal display composed of a liquid crystal device, a twisted retardation film and a pair of polarizing films.

As a liquid crystal device for a color liquid crystal display, a homogeneous liquid crystal device having a twisted angle of zero degrees, a TN (twisted nematic) liquid crystal device having a twisted angle of 90 degrees, and an STN (super twisted nematic) liquid crystal device having a twisted angle between 180 to 270 degrees have been developed.

A conventional example of a color liquid crystal display using a twisted retardation film and adopting an STN liquid crystal device as a liquid crystal device will be explained with reference to FIG. 16 to FIG. 18.

FIG. 18 is a schematic sectional view of the above-described color liquid crystal display, FIG. 16 is a plan view showing a relation between the absorption axes of lower polarizing films and the molecular alignment direction in the liquid crystal, obtained when FIG. 18 is viewed from the upper polarizing film 9 side, and FIG. 17 is also a plan view showing a relation between the absorption axes of the upper polarizing film and the twisted retardation film.

Such a color liquid crystal display is disclosed, for instance, in Japanese Patent Laid-open No. Hei 7-5457.

In the color liquid crystal display, as shown in FIG. 18, a liquid crystal device 20 is formed by holding a nematic liquid crystal 7 in a twisted alignment between a pair of substrates composed of a first substrate 1 which is formed with an alignment layer 3 and a first electrode 2 made of ITO (Indium Tin Oxide) and a second substrate 4 which is formed with an alignment layer 6 and a second electrode 5 made of ITO.

Further, a pair of polarizing films, that is, a lower polarizing film 8 and an upper polarizing film 9, are disposed holding the above-described liquid crystal device 20 thereinbetween, a twisted retardation film 10 is disposed between the liquid crystal device 20 and the upper polarizing film 9, and a reflecting plate 11 is disposed outside of the lower polarizing film 8.

Absorption axes (or transmission axes) of the pair of polarizing films 8 and 9 are disposed in parallel. Here, the twisted angle of the liquid crystal device 20 is 250 degrees. The absorption axis 8a of the lower polarizing film 8 shown by a broken line with arrows in FIG. 16 intersects with the lower molecular alignment direction 7a in the liquid crystal, that is the alignment direction of the liquid crystal in the first substrate 1, at an angle of 45 degrees. The absorption axis 9a of the upper polarizing film 9 shown by a solid line with arrows in FIG. 17 is disposed to intersect with the upper molecular alignment direction 10b in the twisted retardation film 10 at an angle of 45 degrees.

Incidentally, the reference numeral 7b in FIG. 16 shows the upper molecular alignment direction in the liquid crystal, that is the alignment direction in the liquid crystal of the second substrate 4, and the reference numeral 10a in FIG. 17 shows the lower molecular alignment direction in the twisted retardation film 10.

The Δnd value of the liquid crystal device 20 expressed by the product of a difference of the birefringence Δn of the nematic liquid crystal 7 and a cell gap d, that is a space between the first substrate 1 and the second substrate 2, is 843 nm. A twisted angle of the twisted retardation film 10 is 250 degrees in the reverse direction of the twisted angle of the liquid crystal device 20. The Δnd value of the twisted retardation film, which is expressed by the product of a difference Δn of the birefringence of the twisted retardation film 10 and the thickness d, is also 843 nm.

As shown in FIG. 17, since the absorption axis 9a of the upper polarizing film 9 is disposed to intersect with the upper molecular alignment direction 10b in the twisted retardation film 10 at an angle of 45 degrees, linearly polarized light incident from the upper polarizing film 9 becomes elliptic polarized after passing through the twisted retardation film 10.

However, since the upper molecular alignment direction 7b of the liquid crystal in the liquid crystal device 20 deviates from the lower molecular alignment direction 10a in the twisted retardation film by 90 degrees, the elliptic polarized light generated at the liquid crystal device 20 and the twisted retardation film 10 is placed back into its original state of linearly polarized light and reaches the lower polarizing film 8. Since the absorption axis 8a of the lower polarizing film 8 is parallel to the absorption axis 9a of the upper polarizing film 9, a white display is shown.

When voltage is applied between the first electrode 2 and the second electrode 5, the liquid crystal molecules 7 are activated and the apparent Δnd value of the liquid crystal device 20 is decreased. Accordingly, the elliptic polarized light generated at the twisted retardation film 10 cannot be completely canceled by the liquid crystal device 20, and reaches the lower polarizing film 8 without changing its elliptical polarization state. Accordingly, light beams having a specific wavelength penetrate therethrough and generate several colors.

The light that has passed through the lower polarizing film 8 is reflected by a reflecting plate 11 and emits upwards again after passing through the lower polarizing film 8, the liquid crystal device 20, the twisted retardation film 10 and the upper polarizing film 9. Thus, a reflection-type color display can be obtained. That is, it can display in white when no voltage is applied, but according to a voltage increase, it can display in several colors such as yellow, violet, red and so on.

Next, a conventional color liquid crystal display using a retardation film and adopting an STN liquid crystal device as a liquid crystal device will be explained with reference to FIG. 19 to FIG. 21. FIG. 21 is a schematic sectional view of the color liquid crystal display, FIG. 19 is a plan view showing a relation between absorption axes of a lower polarizing film and the molecular alignment direction in the liquid crystal obtained when FIG. 21 is viewed from the upper polarizing film 9 side, and FIG. 20 is also a plan view showing a relation between absorption axes of an upper polarizing film and the phase delay axis of each retardation film.

Such a color liquid crystal display is disclosed, for instance, in Japanese Patent Laid-open No. Hei 8-15691.

As shown in FIG. 21 the color liquid crystal display is comprised of: a liquid crystal device 21 (the twisted angle is the same as that of the liquid crystal device 20 in FIG. 18 but the cell gap is different); a pair of polarizing films, that is, a lower polarizing film 8 and an upper polarizing film 9, disposed holding the liquid crystal device 21 thereinbetween; a first retardation film 15 and a second retardation film 16 disposed between the liquid crystal device 21 and the upper polarizing film 9; and a reflecting plate 11 disposed outside of the lower polarizing film 8.

The absorption axes (or transmission axis) of the pair of polarizing films 8 and 9 are disposed intersecting at almost right angles. Here, the twisted angle of the liquid crystal device 21 is 250 degrees. The absorption axis 8a of the lower polarizing film 8 shown by a broken line with arrows in FIG. 19 intersects with the lower molecular alignment direction 7a in the liquid crystal, that is an alignment direction of the liquid crystal in the first substrate 1, at an angle of 45 degrees. The phase delay axis 16a of the second retardation film 16 shown by a broken line in FIG. 20 is disposed to intersect with the upper molecular alignment direction 7b of the liquid crystal in the liquid crystal device 21 at an angle of 95 degrees, and the absorption axis 9a of the upper polarizing film 9 shown by a solid line with arrows in FIG. 20 is disposed to intersect with the phase delay axis 15a of the first retardation film 15 at an angle of 15 degrees.

The $\Delta$nd value of the above described liquid crystal device 21 is between 1530 nm and 1730 nm. The retardation value of the first retardation film 15 is 1600 nm and the retardation value of the second retardation film 16 is 1550 nm.

Since the absorption axis 9a of the upper polarizing film 9 and the phase delay axis 15a of the first retardation film 15 intersect with each other at an angle of 15 degrees, linearly polarized light incident from the upper polarizing film 9 becomes elliptic polarized after passing through the first retardation film 15 and the second retardation film 16.

However, since the upper molecular alignment direction 7b of the liquid crystal in the liquid crystal device 21 and the phase delay axis 16a of the second retardation film 16 deviate from each other by about 90 degrees, elliptic polarized light generated at the first retardation film 15 and the second retardation film 16 is returned to almost its original state as linearly polarized light to reach the lower polarizing film 8. Since the absorption axis 8a of the lower polarizing film 8 intersects with the absorption axis 9a of the upper polarizing film 9 at almost right angles, a black state is obtained.

When voltage is applied to the first electrode 2 and the second electrode 5, the molecules of the nematic liquid crystal 7 are activated and the apparent $\Delta$nd value of the liquid crystal is decreased. Accordingly, since the elliptic polarized state generated at the first retardation film 15 and the second retardation film 16 cannot be completely canceled by the liquid crystal 21 and reaches the lower polarizing film 8 without changing its elliptic polarized state, light beams having specific wavelengths transmit and generate a plurality of colors.

Since the beams passing through the lower polarizing film 8 are reflected by the reflecting plate 11, and again pass through the lower polarizing film 8, the liquid crystal device 21, the second retardation film 16, the first retardation film 15, and the upper polarizing film 9, and then emit upward, a reflection-type color display can be obtained. That is, it displays in black when no voltage is applied, but according to voltage increase, it displays in several colors such as white, red, blue, green and the like.

However, in an actual color liquid crystal display, since variations in every wavelength dependence of $\Delta$n in the birefringence of the liquid crystal material are different from the variations in every wavelength dependence of $\Delta$n in birefringence of the retardation film or the twisted retardation film, good background colors or tints cannot be obtained with a conventional arrangement of the polarizing films as described above.

With regard to a negative-type display for changing colors of letters while displaying the background color in black, the above described literature discloses that it is possible to dispose the absorption axis 9a (or transmission axis) of the upper polarizing film 9 and the absorption axis 8a (or transmission axis) of the lower polarizing film 8 in a manner that they intersect with each other at almost right angles. However, the literature does not disclose the best condition suitable for coloring the negative-type display, and a reflection-type color liquid crystal display which makes display possible in bright and good color saturation has not yet become practical.

SUMMARY OF THE INVENTION

The present invention is conducted in consideration the present situation and the object of the present invention is to provide a reflection-type color liquid crystal display for a negative-type display to display colored letters and patterns in bright and good color saturation while the background color is displayed in black or in a deep color by optimizing a disposition angle between a liquid crystal device and a sheet of retardation films or a twisted retardation films and a polarizing film, or the like.

In order to achieve the above-described object, in a color liquid crystal display comprising a liquid crystal device holding a nematic liquid crystal in a twisted alignment between a pair of substrates composed of a first substrate having a first electrode and a second substrate having a second electrode, a pair of polarizing films holding the liquid crystal device thereinbetween, and a twisted retardation film disposed between the liquid crystal device and one of the pair of polarizing films, the present invention is characterized in the following configuration.

That is, an angle formed between absorption axes of the pair of polarizing films is set to be in a range between 60 degrees and 120 degrees, a $\Delta$nd value of the above-described liquid crystal device is set in a range between 1500 nm and 1800 nm, and the Δnd value of the above twisted retardation film is set to be in nearly the same range as the Δnd value of the liquid crystal device.

As aforementioned, the Δnd value of the liquid crystal device is expressed by the product of a difference Δn of the birefringence of the nematic liquid crystal and a cell gap d, that is a space between the first substrate and the second substate, and a Δnd value of the twisted retardation film is expressed by the product of a difference Δn of the birefringence of the twisted retardation film and the thickness d.

Instead of or in addition to the Δnd value of both the above-described liquid crystal device and the Δnd value of the twisted retardation film being made to be in the range of 1500 nm to 1800 nm, the twist direction of the twisted retardation film may be set to be in the reverse direction with respect to a twist direction of the liquid crystal device, and the absolute value of the twisted angle of the twisted retardation film may be made larger than the absolute value of the twisted angle of the liquid crystal device by an angle of 5 to 30 degrees.

It is preferable to provide a reflecting plate outside of the polarizing film disposed on the opposite side of the twisted retardation film for the above-described color liquid crystal display.

One or both of the pair of polarizing films may be a colored polarizing film prepared by dying with dyestuffs.

The above-described twisted retardation film may be a temperature-compensating type twisted retardation film in which a Δnd value of the twisted retardation film varies in accordance with temperature.

In a color liquid crystal display comprising a liquid crystal device holding a nematic liquid crystal in a twisted alignment between a pair of substrates composed of a first substrate having a first electrode and a second substrate having a second electrode, a pair of polarizing films holding the liquid crystal device thereinbetween, and a retardation film disposed between the liquid crystal device and one of the pair of polarizing films, the present invention may be structured in the following manner.

An intersecting angle formed between the absorption axis of a polarizing film disposed at the opposite side of the above-mentioned retardation film in relation to the above described liquid crystal device and the lower molecular alignment direction of the liquid crystal in the liquid crystal device is set to be in the range of 35±10 degrees, a Δnd value of the above-described liquid crystal device is set to be in the range between 1500 nm and 1800 nm, and the retardation value of the above-described retardation film is set to be larger than a Δnd value of the above-described liquid crystal device by 50 nm to 200 nm.

Alternatively, a Δnd value of the above-described liquid crystal device may be taken in the range of 1300 nm to 1600 nm, and the retardation value of the above-described retardation film may be taken to be larger than a Δnd value of the above-described liquid crystal device by 300 to 500 nm.

In the above-described color liquid crystal display, as the above-described retardation film, a biaxial retardation film, in which the relation among the refractive index nx of the phase delay axis of the retardation film, the refractive index ny in the y axis direction, and the refractive index nz in the z axis direction is: nx>nz>ny, may be used.

A reflecting plate may be provided outside of the polarizing film disposed at the opposite side of the retardation film in relation to the liquid crystal device.

Alternatively, one or both of the above-described pair of polarizing films may be a colored polarizing film prepared by dying with dyestuffs.

The above-described retardation film may be replaced with a temperature-compensating type retardation film of which the retardation value varies in accordance with temperature.

In the color liquid crystal display according to the present invention, linearly polarized light incident from the upper polarizing film 9 penetrates into the twisted retardation film to become elliptically polarizing light. When no voltage is applied, a Δnd value of the liquid crystal device and a Δnd value of the twisted retardation film are nearly the same. Therefore the elliptic polarized light is returned to a linearly polarized state by the liquid crystal device. The absorption axes of a pair of polarizing films composed of the lower polarizing film and the upper polarizing film form an angle of 60 to 120 degrees. Linearly polarized light emitted through the liquid crystal device is blocked by the lower polarizing film to produce display in black.

In another color liquid crystal display according to the present invention, after linearly polarized light incident from an upper polarizing film enters into a retardation film, since an absorption axis of the upper polarizing film and a phase delay axis of the retardation film form an angle of 45 degrees, the linearly polarized light becomes elliptic polarized light. Since the upper molecular alignment direction in the liquid crystal device and the phase delay axis of the retardation film form an angle of 85 degrees, that is almost orthogonal, the liquid crystal device acts to cancel the elliptic polarized light generated from the retardation film.

However since the liquid crystal device twists itself, in order to completely cancel the elliptical polarization state generated from the retardation film, a Δnd value of the liquid crystal device and a retardation value of the retardation film are designed to have a difference, and the absorption axis of the lower polarizing film and the lower molecular alignment direction in the liquid crystal are arranged to intersect at an angle of 35 degrees, so that the polarized light completely returns to the linearly polarized state to display in black when no voltage is applied.

In any case, when voltage is applied between a first electrode and a second electrode of a liquid crystal device, an apparent Δnd value of the liquid crystal device decreases, elliptic polarized light generated from a twisted retardation film or retardation film does not completely return back to linearly polarized light, and only beams having a certain wavelength can pass through the lower polarizing film, allowing a color display.

By arranging the absorption axis of the upper polarizing film and the upper molecular alignment direction in the twisted retardation film to form an angle in the range from 35 to 40 degrees or from 50 to 55 degrees, compensation for degradation of blackness on the background generated from a difference between the wavelength dependency of a difference Δn of birefringence of the twisted retardation film 10 and the wavelength dependence of a difference of birefringence Δn of birefringence of the liquid crystal, and degradation of color saturation of the display can be performed better than in the case where an angle between the absorption axis of the upper polarizing film and the upper molecular alignment direction in the twisted retardation film is set to be 45 degrees.

Similarly, by arranging the absorption axis of the lower polarizing film and the lower molecular alignment direction of the liquid crystal in the liquid crystal device to form an angle in the range from 35 to 40 degrees or from 50 to 55 degrees, compensation for degradation of blackness on the background generated from a difference between wavelength dependency of a difference Δn of birefringence of the twisted retardation film 10 and the wavelength dependency of a difference Δn of birefringence of the liquid crystal, and degradation of color saturation of the display can be performed better than in the case where the angle between the absorption axis of the lower polarizing film and the lower molecular alignment direction of the liquid crystal in the liquid crystal is taken to be 45 degrees.

Further, in each case, by arranging a Δnd value of the liquid crystal device and a Δnd value of the twisted retardation film in a range from 1500 nm to 1800 nm, an apparent Δnd value largely varies with a slight difference in applied voltage, so that it becomes possible to change the color from black to a final color of green, which makes it possible to display in several colors even with a high multiplex drive.

When a twisted retardation film is used, by arranging the twist direction of the twisted retardation film in the reverse direction to the twist direction of the liquid crystal device, and by making the absolute value of the twisted angle of the twisted retardation film larger than the absolute value of the twisted angle of the liquid crystal device, the wavelength dependency of the difference Δn of the birefringence of the liquid crystal device and wavelength dependency of the difference Δn of the birefringence of the twisted retardation film 10 are compensated, and thus the blackness of the background color is improved, the displaying color becomes bright and a better negative-type display can be obtained.

The above and other objects, features and advantages of the invention will be apparent from the following detailed description which is to be read in conjunction with the accompanying drawings.

BRIEF DESCRIPTION OF THE DRAWINGS

FIG. 7 is a schematic sectional view of the structure of a second embodiment of a color liquid crystal display according to the present invention;

FIG. 11 is a schematic sectional view of the structure of a third embodiment of a color liquid crystal display according to the present invention;

FIG. 14 is a schematic sectional view of the structure of a fourth embodiment of a color liquid crystal display according to the present invention;

FIG. 18 is a schematic sectional view of the structure of a conventional color liquid crystal display using a twisted retardation film;

FIG. 21 is a schematic sectional view of the structure of a conventional color liquid crystal splay using a retardation film.

DETAILED DESCRIPTION OF THE PREFERRED EMBODIMENTS

The preferred embodiments to carry out the present invention will be concretely explained with reference to the drawings.

First Embodiment: FIG. 1 to FIG. 4

A first embodiment of a color liquid crystal display according to the present invention will be explained with reference to FIG. 1 to FIG. 4.

Figure 1:
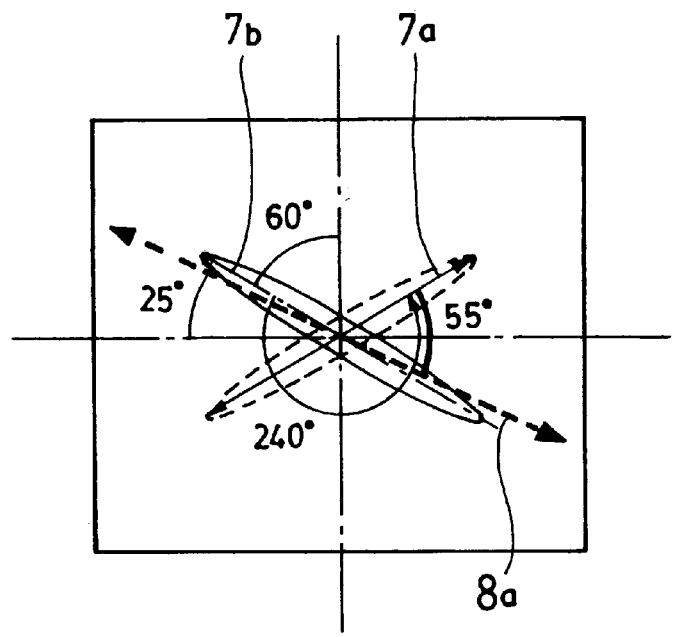
FIG. 1 is a plan view showing a relation between absorption axes of lower polarizing films and the molecular alignment direction in a liquid crystal device.
Figure 2:
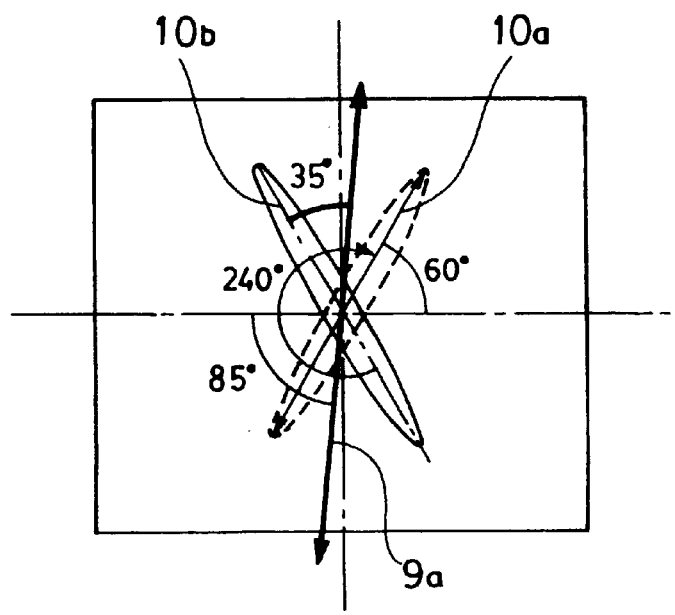
FIG. 2 is also a plan view showing a relation between absorption axes of upper polarizing films and the molecular alignment direction in a twisted retardation film.
Figure 3:
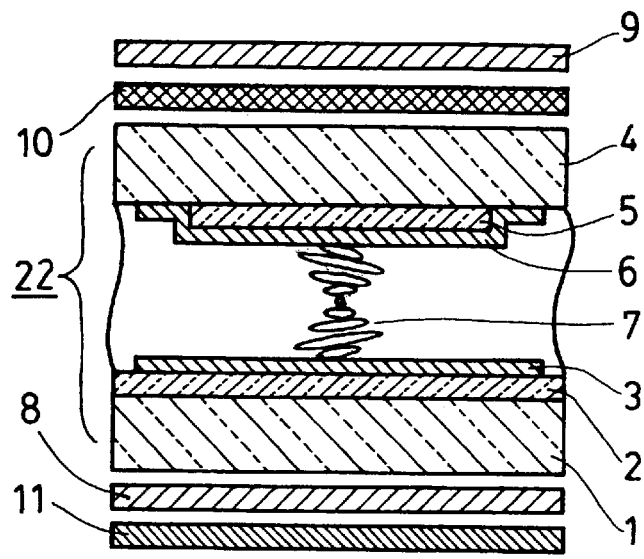
FIG. 3 is a schematic sectional view of the structure of a first embodiment of a color liquid crystal display according to the present invention.
Figure 4:
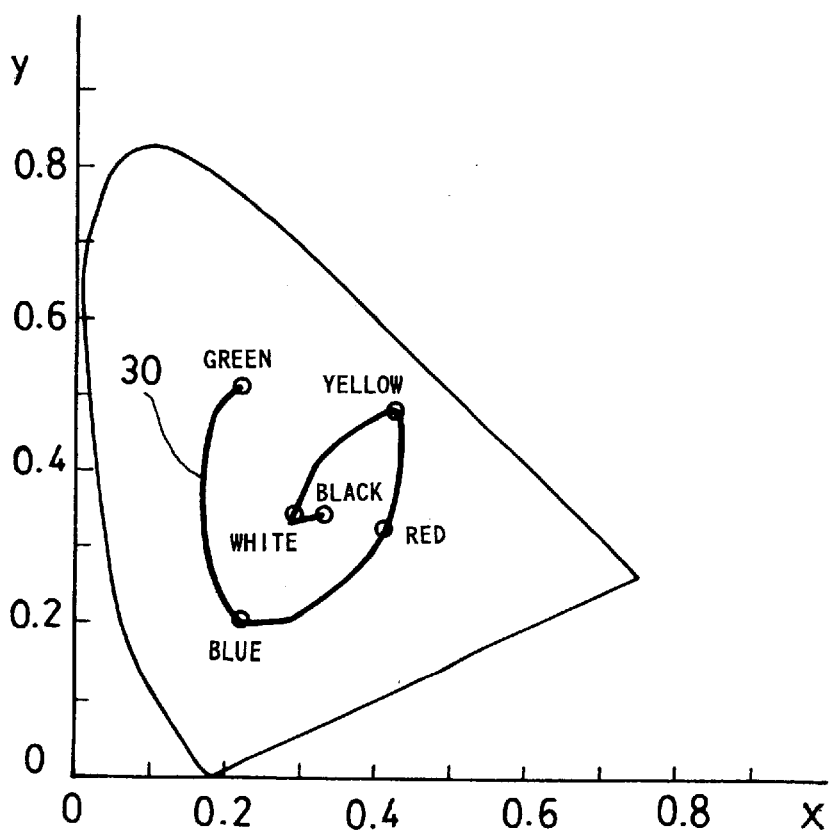
FIG. 4 is a chromaticity diagram explaining changes in color on display images when a voltage applied on the liquid crystal device is varied, in the first embodiment according to the present invention.

FIG. 3 is a schematic sectional view showing the structure of the color liquid crystal display, FIG. 1 is a plan view showing a relation between absorption axes of lower polarizing film and the molecular alignment direction of a liquid crystal in a liquid crystal device, obtained when FIG. 3 is viewed from the upper polarizing film 9 side, FIG. 2 is also a plan view showing a relation between absorption axes of upper polarizing films and the molecular alignment direction in a twisted retardation film; and FIG. 4 is a chromaticity diagram.

Figure 16:
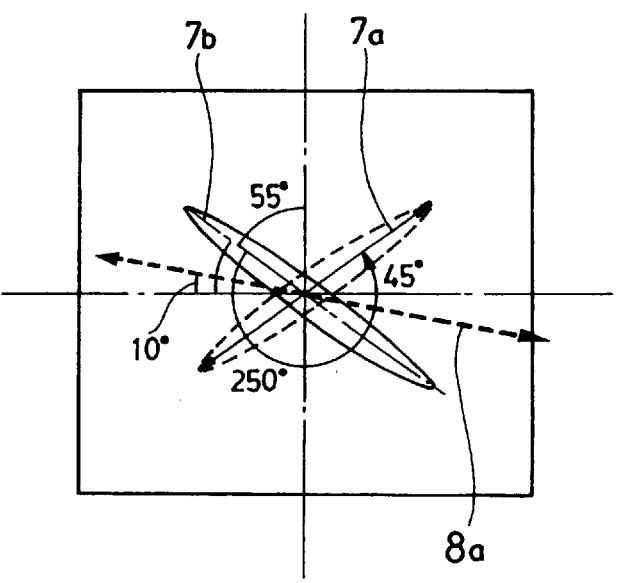
FIG. 16 is a plan view showing a relation between absorption axes of lower polarizing films and the molecular alignment direction of a liquid crystal in a liquid crystal device, obtained when
Figure 17:
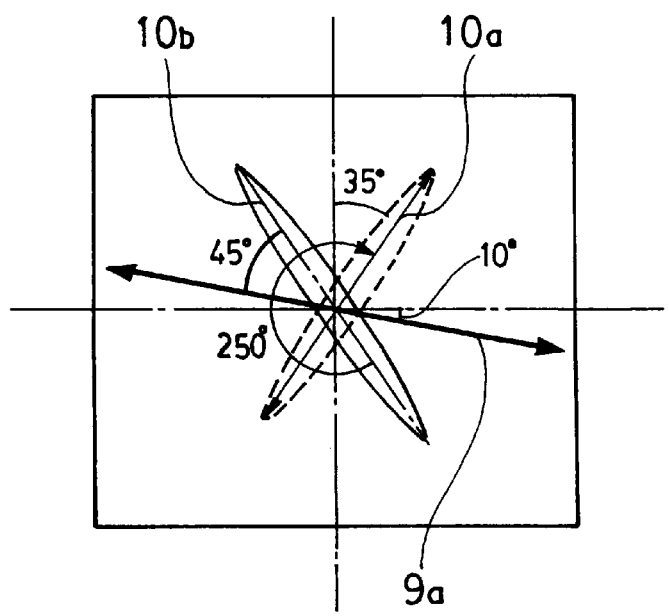
FIG. 17 is also a plan view showing a relation between absorption axes of upper polarizing films and the molecular alignment direction in a twisted retardation film.
Figure 18:
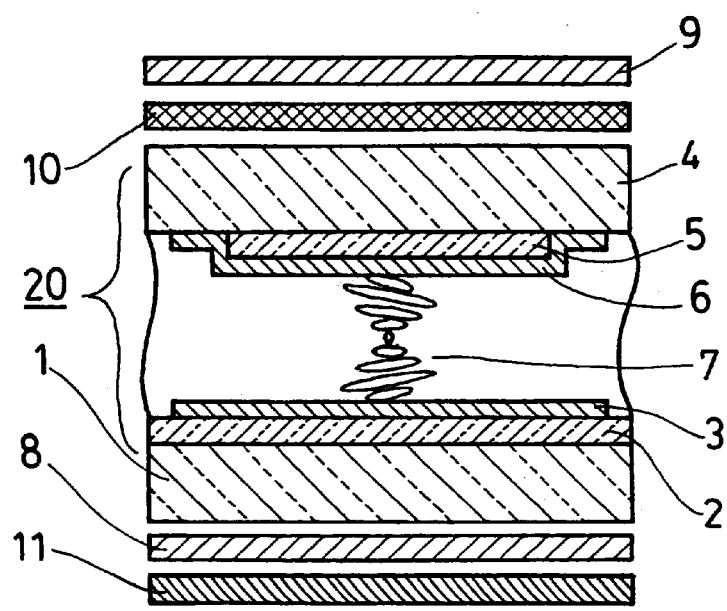
FIG. 18 is viewed from above.
Figure 19:
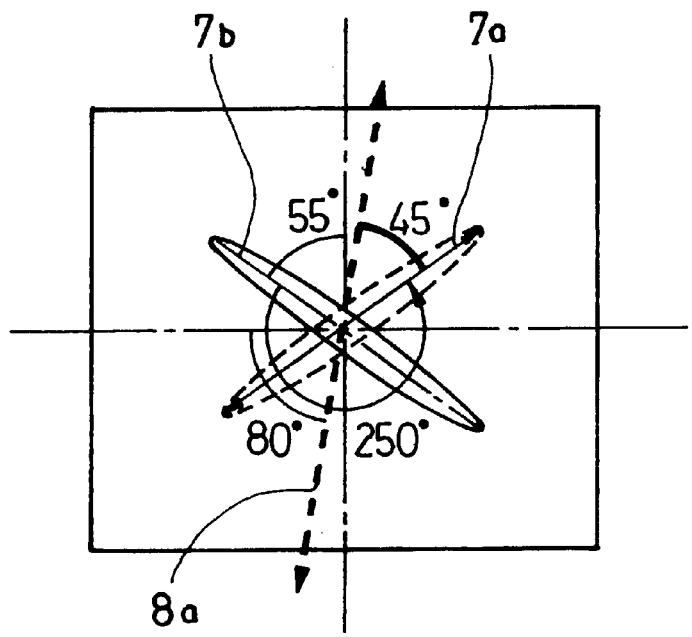
FIG. 19 is a plan view showing a relation between absorption axes of lower polarizing films and the molecular alignment direction of a liquid crystal in a liquid crystal device, obtained when
Figure 20:
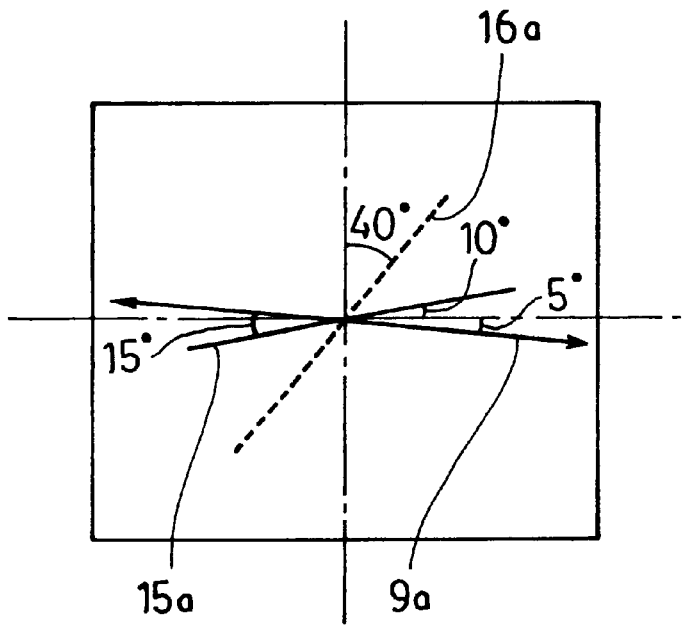
FIG. 20 is also a plan view showing a relation between an absorption axis of an upper polarizing film and a phase delay axis of a retardation film.
Figure 21:
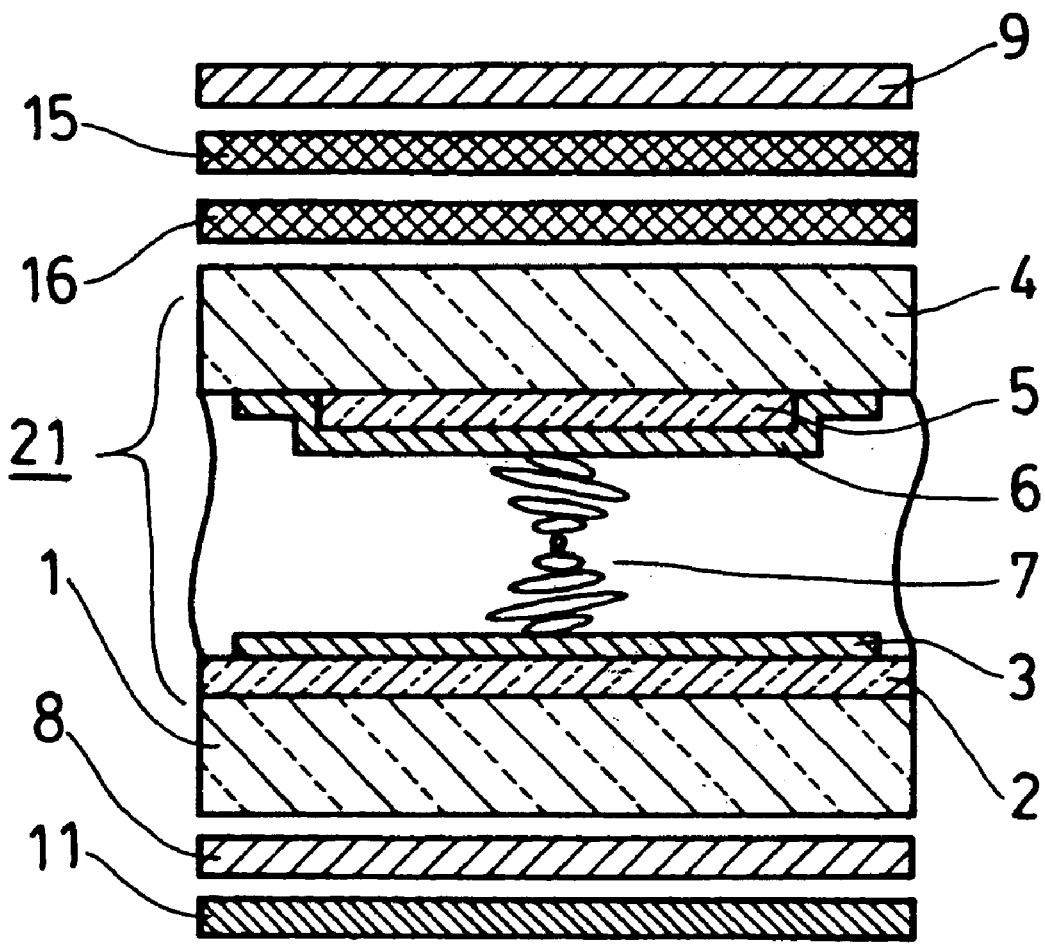
FIG. 21 is viewed from above.

The structure of the color liquid crystal display is not the same as the conventional color liquid crystal display shown in FIG. 16 to FIG. 18, but since the fundamental constitutions are in common with each other, the portions in FIG. 1 to FIG. 3 corresponding to each portion in FIG. 16 to FIG. 18 are given the same reference numeral or symbol, for convenience of explanation.

In the structure of the color liquid crystal display of the first embodiment, as shown in FIG. 3, a liquid crystal device 22 is composed holding a nematic liquid crystal 7 in a twisted state between a pair of substrates comprising a first substrate 1 made of a glass plate having a thickness of 0.7 mm, there being formed a first electrode 2 and an alignment layer 3 thereon, and a second substrate 4 made of a glass plate having a thickness of 0.7 mm, there being formed a second electrode 5 and an alignment layer 6 thereon. The first electrode 2 and the second electrode 5 are transparent electrodes made from ITO (Indium Tin Oxide).

The difference $\Delta n$ of birefringence of the nematic liquid crystal used for the liquid crystal device 22 is set to be 0.2 and the cell gap d, that is a space between the first substrate 1 and the second substrate 4, is set to be 8 $\mu m$. Accordingly, the $\Delta nd$ value of the liquid crystal device 22 expressed by the product of the difference $\Delta n$ of birefringence of the nematic liquid crystal 7 and the cell gap d is 1600 nm.

The alignment layer 3 of the first substrate 1 is processed by a rubbing treatment parallel to the lower molecular alignment direction 7a in the liquid crystal shown in FIG. 1, and the alignment layer 6 of the second substrate 4 is processed by a rubbing treatment parallel to the upper molecular alignment direction 7b in the liquid crystal.

An optically rotating substance called a chiral material is added to the nematic liquid crystal having a viscosity of 20 cp, and the twist pitch P is adjusted to 16 $\mu m$, so that d/P=0.5, to form a liquid crystal device twisting 240 degrees counterclockwise.

The twisted retardation film 10 is prepared by the following processes. A cholesteric liquid crystal polymer having a high phase-transition temperature is coated on a triacetyl cellose (TAC) film, and after alignment treatment under high temperature, it is rapidly cooled and solidified. The film is twisted like the liquid crystal.

The twisted retardation film 10 is disposed between the second substrate 4 and the upper polarizing film 9 and the $\Delta nd$ value of the twisted retardation film, which is expressed by the product of the difference of birefringence $\Delta n$ of the twisted retardation film 10 and the thickness d of the twisted retardation film 10 is set to 1600 nm.

The lower molecular alignment direction 10a in the twisted retardation film 10, shown in FIG. 2, is disposed to be at a position deviating by 90 degrees from the upper molecular alignment direction 7b of the liquid crystal in the liquid crystal device 2, and the upper molecular alignment direction 10b in the twisted retardation film 10 is designed to twist clockwise by 240 degrees so that it turns reverse to the twisted angle of the liquid crystal device 22.

The lower polarizing film 8 is disposed outside of the first substrate 1 of the liquid crystal device 22, and the upper polarizing film 9 is disposed outside of the twisted retardation film 10.

The absorption axis 9a of the upper polarizing film 9, shown in FIG. 2, is disposed to intersect with the upper molecular alignment direction 10b in the twisted retardation film 10 at an angle of 35 degrees, and the absorption axis 8a of the lower polarizing film 8 is disposed to intersect with the lower molecular alignment direction 7a of the liquid crystal in the liquid crystal device 22 at an angle of 55 degrees. The intersecting angle between the pair of upper and lower polarizing films 8 and 9 is 70 degrees.

A reflecting plate 11 which reflects colored beams that have passed through the lower polarizing film 8 is disposed outside of the lower polarizing film 8.

In the color liquid crystal display configured as above, when no voltage is applied, linearly polarized light incident from the upper polarizing film 9 becomes elliptically polarized light due to the birefringence of the twisted retardation film 10, but since the $\Delta nd$ value of the twisted retardation film 10 is equal to the $\Delta nd$ value of the liquid crystal device 22, it returns to its linearly polarized state in the liquid crystal device 22. At this moment, since the absorption axis 9a of the upper polarizing film 9 intersects with the absorption axis 8a of the lower polarizing film 8 at an angle of 70 degrees, the beam of light does not pass through the lower polarizing film 8, resulting in a black display.

When voltage is applied between the first electrode 2 and the second electrode 5, molecules of the nematic liquid crystal 7 are activated and the apparent $\Delta nd$ value of the liquid crystal device 22 is decreased. Consequently, elliptic polarized light generated at the twisted retardation film 10 does not return to a completely linear polarized state after passing through the liquid crystal device 22. Therefore, it reaches the lower polarizing film 8 in an elliptical polarization state and a beam having a specific wavelength passes through the lower polarizing film 8 to be viewed as colored light.

The colored beam that passed through the lower polarizing film 8 is reflected by the reflection plate 11 and is again emitted upward through the liquid crystal device 22, the twisted retardation film 10 and the upper polarizing film 9 and makes a negative-type color display.

FIG. 4 is a chromaticity diagram in which a curved line 30 shown by a solid line expresses color changes when voltage is gradually increased from the no voltage state in the color liquid crystal display of the first embodiment.

With no voltage applied, it is almost monochrome black, but when voltage is applied, it changes to white, then red through yellow, then blue and finally it becomes green.

By disposing the absorption axis 9a of the upper polarizing film 9 and the upper molecular alignment direction 10b in the twisted retardation film 10 to intersect with each other at an angle of 35 degrees, and by disposing the absorption axis 8a of the lower polarizing film 8 and the lower molecular alignment direction 7a of the liquid crystal in the liquid crystal device 22 to intersect with each other at an angle of 55 degrees, any difference between the wavelength dependency of the difference $\Delta n$ of birefringence of the liquid crystal device 22 and the wavelength dependency of the difference $\Delta n$ of birefringence of the twisted retardation film 10 can be compensated and a good bright color as well as a good black background can be obtained.

Particularly, since with a negative-type display of a black background, incident light from the surroundings of pixels is also blocked, a dark display is obtained. Therefore a brighter displaying color is preferable.

However, the angle, in the color liquid crystal display of the present invention, formed by the absorption axis 9a of the upper polarizing film 9 and the upper molecular alignment direction 10b in the twisted retardation film 10 is not limited to 35 degrees, and by varying the arrangement in a range of 35 to 40 degrees or 50 to 55 degrees, the difference between the wavelength dependency of the difference $\Delta n$ of birefringence of the liquid crystal device and the wavelength dependency of the difference $\Delta n$ of birefringence of the twisted retardation film 10 can be compensated and a good bright color can be obtained.

When the intersecting angle between the upper polarizing film 9 and the lower polarizing film 8 is made smaller than 70 degrees, the displaying color gets brighter, but since the black color on the background also gets thinner, it is preferable to arrange the intersecting angle between the upper polarizing film 9 and the lower polarizing film 8 to be in the range of 60 to 120 degrees.

In addition, the Δnd value of the liquid crystal device and the Δnd value of the twisted retardation film are adjusted to 1600 nm in this embodiment, but by adjusting them in a range of 1500 nm to 1800 nm, nearly the same effects can be obtained.

When the Δnd value of the liquid crystal device is made smaller than 1500 nm, it is undesirable because the sharpness of the liquid crystal deteriorates and the high multiplex drive becomes hard to perform, but this is applicable if the device is a low multiplex drive or active matrix drive.

When the Δnd value of the liquid crystal device and the Δnd value of the twisted retardation film are set to be larger than 1800 nm, since the cell gap d is required to be thick, it is undesirable because the response time of the liquid crystal device becomes slow and characteristics of the twisted retardation film 10 are lowered due to various difficulties in production.

In the present embodiment, the Δnd value of the liquid crystal device and the Δnd value of the twisted retardation film are designed to be equal, but it is possible to make the Δnd value of the liquid crystal device larger than the Δnd-value of the twisted retardation film. When the Δnd value of the liquid crystal device is designed to be about 50 nm larger than the Δnd value of the twisted retardation film, the Δnd value of the liquid crystal device is reduced under high temperatures so that the Δnd value of the liquid crystal device becomes equal with the Δnd value of the twisted retardation film, which results in the improvement of high-temperature characteristics.

In addition, an STN (super twisted nematic) liquid crystal device having a 240° twist is used in the present embodiment, but it is possible to obtain a similar effect by using a TN (twisted nematic) liquid crystal device having a 90° twist or a STN liquid crystal device having more than a 180° twist.

Furthermore, since a retardation film made from a liquid crystal polymer in which the twisting state is fixed at room temperature is used as a twisted retardation film in the present embodiment, the Δnd value does not change at varied temperatures, but in a temperature-compensating type twisted retardation film which undergoes a twist alignment layer treatment so that a portion of the liquid crystal molecules connected to an open chain polymer molecule, the Δnd value varies according to the temperature change.

When a temperature-compensating type twisted retardation film is used, the change of Δnd value of the twisted retardation film follows the change of Δnd value of the liquid crystal device caused by the temperature change. As a result, the color change due to the ambient temperature is reduced, and the applicable operating temperature range is enlarged, resulting in better operation.

Second Embodiment: FIG. 5 to FIG. 8

Next, a second embodiment of the color liquid crystal display according to the present invention will be explained with reference to FIG. 5 to FIG. 8.

Figure 5:
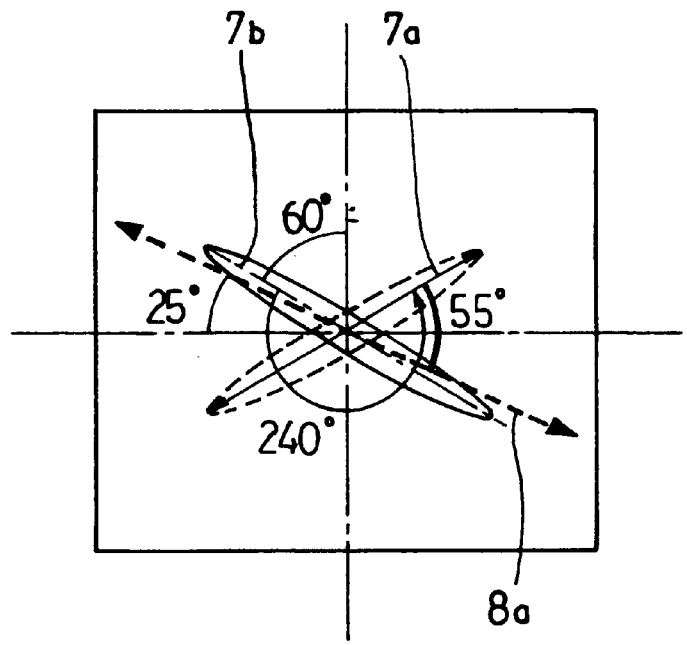
FIG. 5 is a plan view showing a relation between absorption axes of lower polarizing films and the molecular alignment direction of a liquid crystal in a liquid crystal device, obtained when
Figure 6:
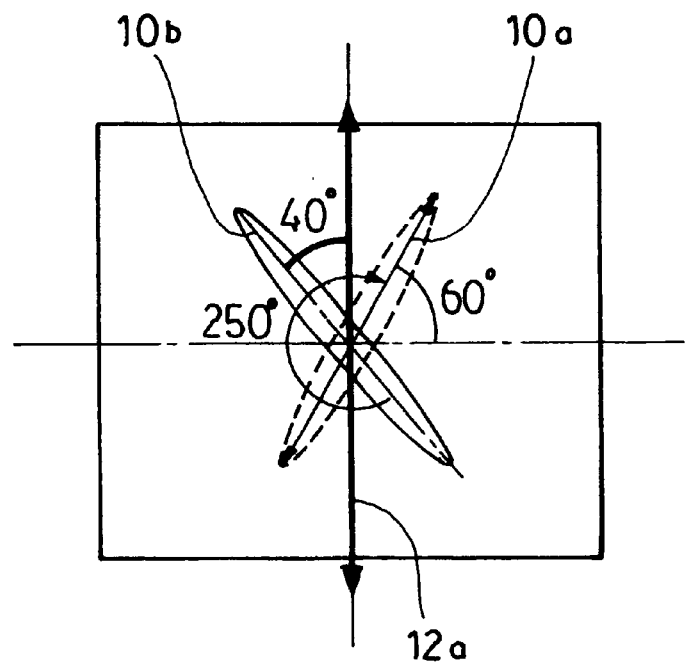
FIG. 6 also a plan view showing a relation between absorption axes of upper polarizing films and the molecular alignment direction in a twisted retardation film.
Figure 7:
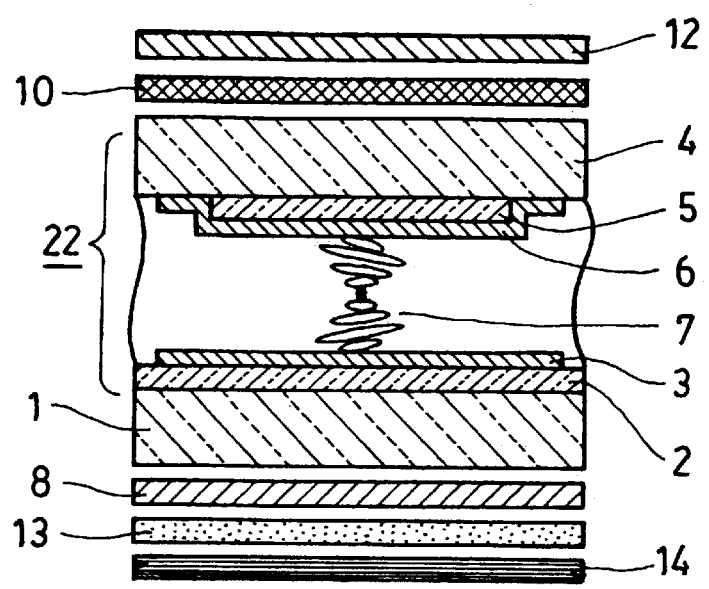
FIG. 7 is viewed from above.
Figure 8:
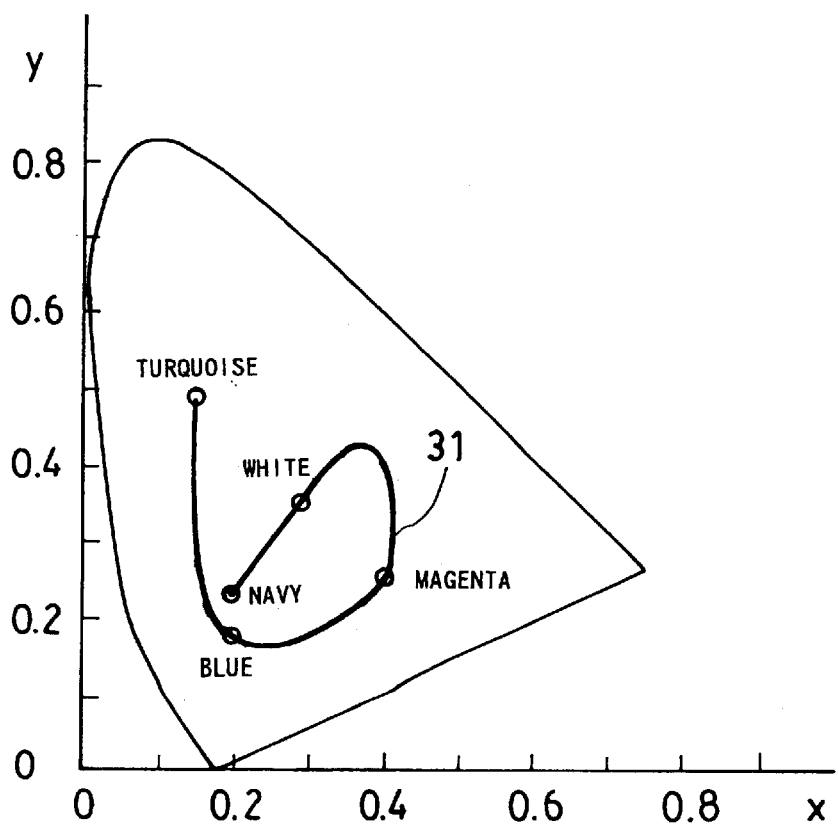
FIG. 8 is a chromaticity diagram explaining changes in color on display images when a voltage applied on the liquid crystal device is varied, in the second embodiment according to the present invention.

FIG. 7 is a schematic sectional view showing a structure of the color liquid crystal display, FIG. 5 is a top plan view showing a relation between absorption axes of lower polarizing films and the molecular alignment direction of the liquid crystal in a liquid crystal device obtained when the color liquid crystal device shown in FIG. 7 is viewed from the top, FIG. 6 is also a top plan view showing a relation between absorption axes of upper polarizing films and the molecular alignment direction in a twisted retardation film, and FIG. 8 is a chromaticity diagram.

In FIG. 5 to FIG. 7, parts corresponding to those in FIG. 1 to FIG. 3 are given the same reference numerals and symbols, and the explanation for these parts is omitted.

The color liquid crystal display of the second embodiment has a different configuration from that of the first embodiment with respect to the twisted angle of the twisted retardation film, to upper polarizing film materials, and to characteristics of the reflecting plate, and is further provided with a back light.

The configuration of the liquid crystal device 22 in the color liquid crystal display is the same as that of the liquid crystal device 22 of the aforementioned first embodiment. The difference Δn of birefringence of the nematic liquid crystal 7 is 0.2, the cell gap d, that is a space between a first substrate 1 and a second substrate 4, is 8 μm, and the Δnd value of the liquid crystal device 22 is 1600 nm.

An alignment layer 3 of the first substrate 1 is processed by a rubbing treatment parallel with the lower liquid crystal molecular direction 7a, shown in FIG. 7, and the alignment layer 6 of the second substrate 4 is likewise treated parallel with the upper liquid crystal molecular direction 7b. An optically rotating substance called a chiral material is added to a nematic liquid crystal having a viscosity of 20 cp, and the twist pitch P is adjusted to 16 μm so that d/P=0.5, to form a liquid crystal device 22 twisting 240 degrees counterclockwise.

To obtain a twist phase different plate 10, a cholesteric liquid crystal polymer having a high phase transition temperature is coated on a TAC film, and after an alignment treatment under high temperature, it is cooled and solidified. The twist phase different plate 10 is a film having a twist like a liquid crystal. The twisted retardation film 10 is disposed outside of the second substrate 4 of the liquid crystal device 22 and the Δnd value of the twisted retardation film, which is expressed by the product of the difference Δn of birefringence of the twisted retardation film 10 and the thickness d, is designed to be 1600 nm.

The lower molecular alignment direction 10a in the twisted retardation film 10 shown in FIG. 6 is disposed to take a position deviating from the upper molecular alignment direction 7b of the liquid crystal in the liquid crystal device 22 by 90 degrees. The upper molecular alignment direction 10b in the twisted retardation film 10 shown in FIG. 6 is arranged to be at a twisted angle of 250° clockwise so that it is the reverse direction to the twisted angle of the liquid crystal device.

The lower polarizing film 8 is disposed outside of the first substrate 1 of the liquid crystal device 22, and a blue-colored polarizing film 12 as an upper polarizing film is disposed outside of the twisted retardation film 10. An absorption axis 12a of the color polarizing film 12, which is shown in FIG. 6, is disposed to be at an angle of 40 degrees to the upper molecular direction 10b in the twisted retardation film 10. An absorption axis 8a of the lower polarizing film 8 shown in FIG. 5 is disposed to be at an angle of 55 degrees to the lower molecular alignment direction 7a of the liquid crystal in the liquid crystal device 22, and the intersecting angle of the lower polarizing film 8 and the color polarizing film 12 is 65 degrees.

The upper polarizing film 9 and the lower polarizing film 8 used in the first embodiment are made of a drawn film of PVA dyed with iodine, being put between TAC films, but the color polarizing film 12 is a polarizing film dyed with a dichromatic dye instead of iodine. Usually, when two sheets of the color polarizing films are disposed parallel, they show an almost white color having a faint color of the dye. When the color polarizing films are disposed intersecting with each other, they show a clear color of the dye.

When two sheets of blue color polarizing films 12 adopted in the present embodiment are disposed parallel, the device displays in a faint bluish white color, but when they are disposed intersecting with each other, it displays in navy blue.

As shown in FIG. 7, a transflective reflecting plate 13 is disposed outside of the lower polarizing film 8, and a back light 14 using an electro-luminescence (EL) emitting light in white is further disposed outside of the transflective reflecting plate 13.

Thus, the device consists of a color liquid crystal display serving both as a reflection-type and a translucent-type. It is usually used as a reflection-type color liquid crystal display, but during dark nighttime hours it can be used as a translucent-type color liquid crystal display by turning on the back light 14.

With no voltage applied, the color liquid crystal display in the second embodiment shows a navy blue which is the color shown when the color polarizing films 12 intersect with each other at right angles, and when voltage is applied to the liquid crystal device, it becomes a negative-type color display showing first a pale bluish white, then reddish violet, blue, and bluish green.

FIG. 8 is the chromaticity diagram and a curved line 31 expressed by a solid line shows the color change caused by the applied voltage on the color liquid crystal display of the second embodiment.

In the case of the present embodiment, since some blue light always shines through the color polarizing film 12, saturation of the displaying color is interior compared with the case composed with an ordinary polarizing film, but by disposing the absorption axis 12a of the color polarizing film 12 and the lower molecular alignment direction 7a of the liquid crystal in the liquid crystal device 22 so as to be at an angle between 35° and 40° or between 50° and 55°, the difference between the wavelength dependency of the difference $\Delta n$ of birefringence of the liquid crystal device and the wavelength dependency of the difference $\Delta n$ of birefringence of the twisted retardation film 10 is compensated, resulting in a good and bright color.

In addition, by making the absolute value of the twisted angle of the twisted retardation film 10 to be 10 degrees larger than the absolute value of the twisted angle of the liquid crystal device 22, deterioration of the saturation can be reduced and the brightness of the displaying color can be improved so that an excellent negative-type color display can be provided.

In the present embodiment, the intersecting angle of the lower polarizing film 8 with the color polarizing film 12 is made to be 65 degrees, but when the intersecting angle is made smaller, the displaying color becomes bright. However, since a black color on the background also becomes pale, a range between 60° and 120° is preferable.

In the present embodiment, the twisted angle of the twisted retardation film 10 is made 250°, but when the twisted angle is made larger, although the displaying color becomes bright, the black color on the background becomes pale. Therefore, it is preferable to set the absolute value of the twisted angle of the retardation film 10 to be larger than the absolute value of the twisted angle of the liquid crystal device 22 by a range of 5 to 30 degrees.

Furthermore, in the present embodiment, the $\Delta nd$ value of the liquid crystal device and the $\Delta nd$ value of the twisted retardation film 10 are 1600 nm, but by setting them in a range of 1500 nm to 1800 nm, almost similar effects can be obtained. When the $\Delta nd$ value of the liquid crystal device is made smaller than 1500 nm, the sharpness of the liquid crystal is unfavorably lowered and high multiplex drive becomes hard to carry out, but by making the absolute value of the twisted angle of the twisted retardation film 10 larger than that of the twisted angle of the liquid crystal device, a color improvement can be similarly obtained, and this is applicable if the device is a low multiplex drive or an active matrix drive.

Additionally, making the $\Delta nd$ value of the liquid crystal device and the $\Delta nd$ value of the twisted retardation film larger than 1800 nm, since the cell gap d is made thicker, is undesirable because the response time of the liquid crystal device slows, and moreover the characteristics of the twisted retardation film 10 deteriorate due to various difficulties in production. But a color improvement can be obtained by setting the absolute value of the twisted angle of the twisted retardation film 10 larger than the absolute value of the twisted angle of the liquid crystal device 22.

In the present embodiment, the blue color polarizing film is used, but even when a color polarizing film having another color such as red, green, violet or the like, or an ordinary iodine-type polarizing film having a normal color is used, a color improvement can be obtained by setting the absolute value of the twisted angle of the twisted retardation film larger than the absolute value of the twisted angle of the liquid crystal.

Third Embodiment: FIG. 9 to FIG. 12

Next, a third embodiment of a color liquid crystal display according to the present invention will be explained with reference to FIG. 9 to FIG. 12.

Figure 9:
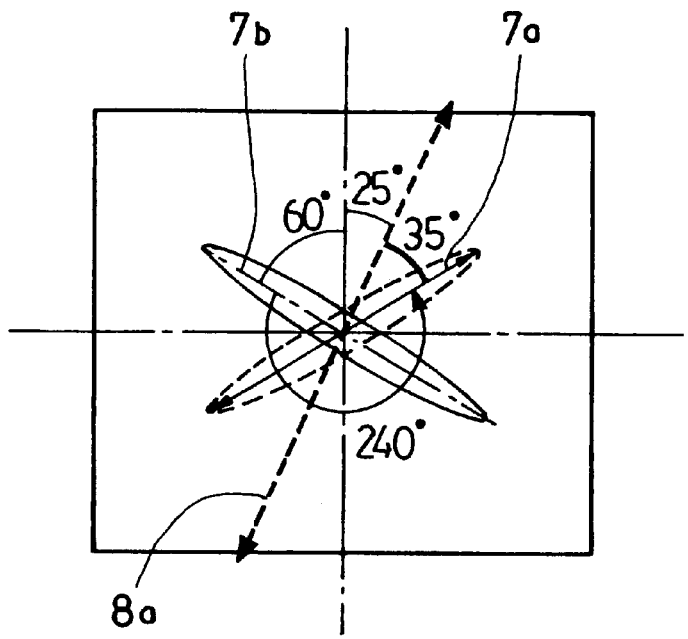
FIG. 9 is a plan view showing a relation between absorption axes of lower polarizing films and the molecular alignment direction of a liquid crystal in a liquid crystal device, obtained when
Figure 10:
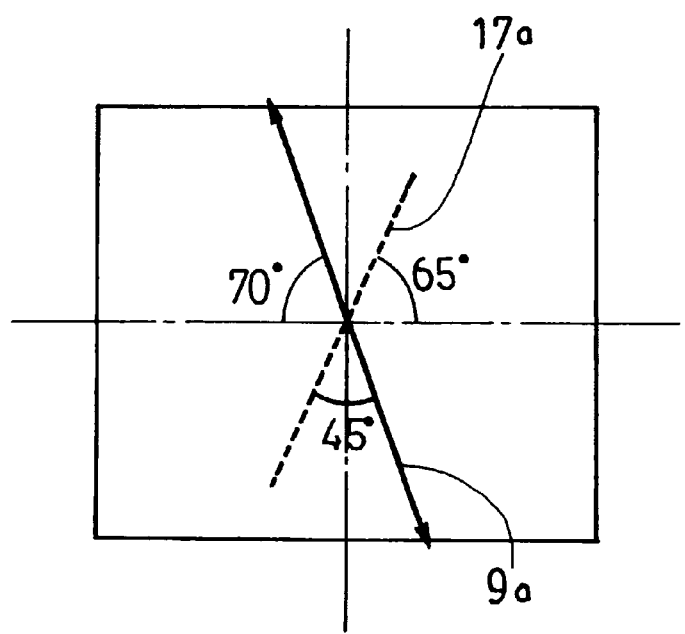
FIG. 10 is also a plan view showing a relation between an absorption axis of an upper polarizing film and a phase delay axis of a retardation film.
Figure 11:
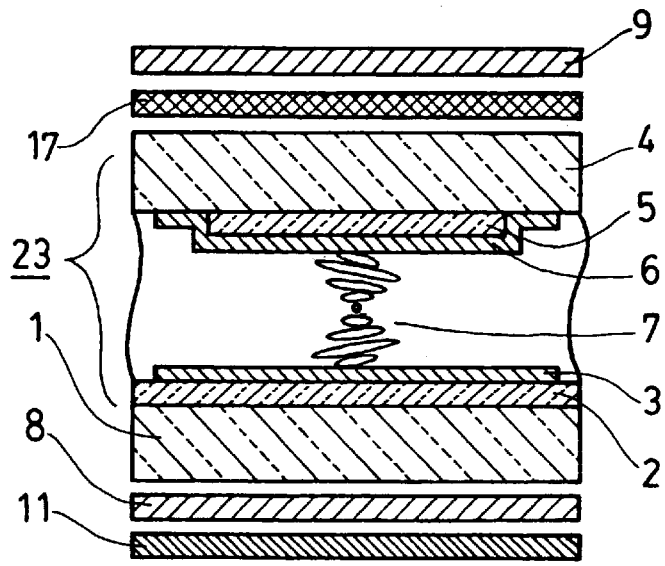
FIG. 11 is viewed from above.
Figure 12:
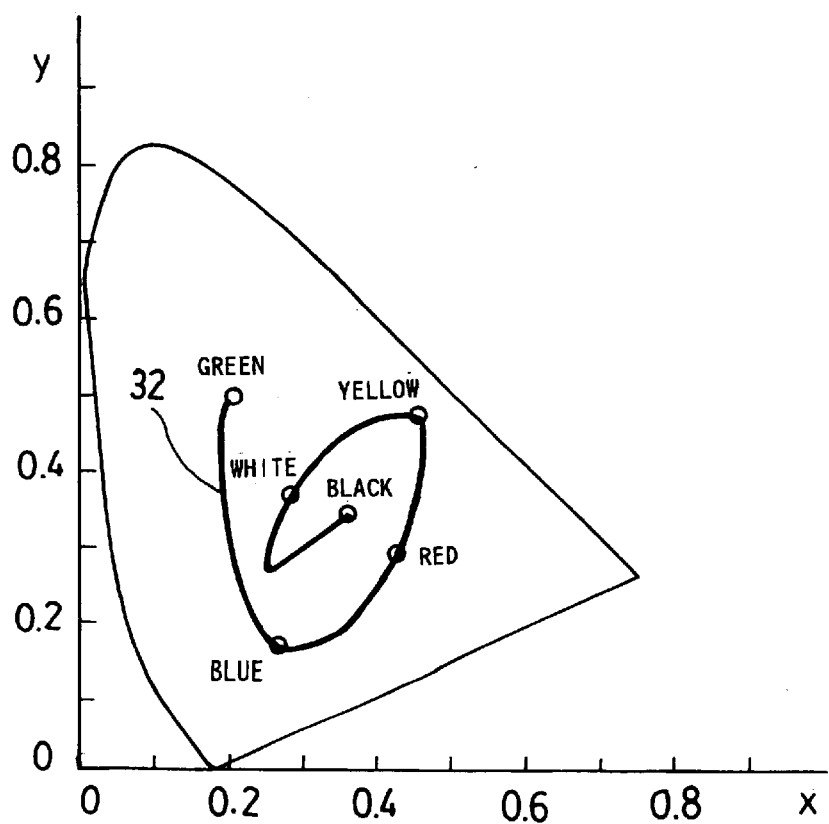
FIG. 12 is a chromaticity diagram explaining changes in color on display images when a voltage applied on the liquid crystal device is varied, in the third embodiment according to the present invention.

FIG. 11 is a schematic sectional view showing a structure of the color liquid crystal display, FIG. 9 is a top plan view showing a relation between an absorption axis of a lower polarizing film and the molecular alignment direction of the liquid crystal in the liquid crystal device, obtained when viewed from the top, and FIG. 10 is a plan view showing a relation between an absorption axis of an upper polarizing film and a phase delay axis of a retardation film. FIG. 12 is a chromaticity diagram of the color liquid crystal display.

In these drawings, parts corresponding to the parts in FIG. 1 to FIG. 3 are given the same numerals and symbols. In the third embodiment, a retardation film 17 is used instead of the twisted retardation film 10 used in the first and second embodiments.

The liquid crystal device 23 in the color liquid crystal display has a similar constitution to that of the liquid crystal device 22 in the first embodiment, which is shown in FIG. 3. However, the difference $\Delta n$ of birefringence of the nematic liquid crystal 7 is 0.21, and the cell gap d, that is a space between the first substrate 1 and the second substrate 4, is 8 $\mu$m, so the $\Delta nd$ value of the liquid crystal expressed by the product of the difference $\Delta n$ of birefringence of the nematic liquid crystal 7 and the cell gap d is 1680 nm.

The alignment layer 3 of the first substrate 1 is processed with a rubbing treatment parallel to the lower molecular alignment direction 7a in the liquid crystal which is shown in FIG. 7. The alignment layer 6 of the second substrate 4 is processed with a rubbing treatment parallel to the upper molecular alignment direction 7b in the liquid crystal. An optically rotating substance called a chiral material is added to the nematic liquid crystal having a viscosity of 20 cp, and the twist pitch P is adjusted to 16 $\mu$m so that d/P=0.5 is obtained, whereby a liquid crystal device twisting 240 degrees counterclockwise is obtained.

The retardation film 17 shown in FIG. 11 is a polycarbonate film which is made by a single axis stretching. Consequently, when the refractive index of a phase delay axis 17a shown in FIG. 10 of the retardation film 17 is defined as nx, the refractive index in the Y-axis direction intersecting at right angles with the phase delay axis 17a is defined to be ny, and the refractive index of the Z-axis direction which is the direction in thickness is defined to be nz, the resulting relationship becomes nx>ny=nz.

The retardation film 17 is disposed outside of the second substrate 4 of the liquid crystal device 23, and the retardation value of the retardation film 17 is set to 1800 nm. Accordingly, the retardation value of the retardation film 17 is 120 nm larger than the Δnd value of the liquid crystal device 23. The phase delay axis 17a of the retardation film 17 is disposed at a position deviating from the upper molecular alignment direction 7b of the liquid crystal in the liquid crystal device 23 by 85 degrees.

The lower polarizing film 8 shown in FIG. 11 is disposed outside of the first substrate 1 of the liquid crystal device 23, and the upper polarizing film 9 is disposed outside of the retardation film 17. The absorption axis 9a of the upper polarizing film 9 shown in FIG. 10 is disposed at a position 45° counterclockwise from the phase delay axis 17a of the retardation film 17. The absorption axis 8a of the lower polarizing film 8 shown in FIG. 9 is disposed at a position 35° counterclockwise from the lower molecular alignment direction 7a of the liquid crystal in the liquid crystal device 23, thus the pair of upper and lower polarizing films 8 and 9 intersect at an angle of 45 degrees.

The reflecting plate 11 which reflects color rays that have passed through the lower polarizing film 8 is disposed outside of the lower polarizing film 8.

In the color liquid crystal display of the third embodiment of the present invention constructed as above, when no voltage is applied, linearly polarized light incident from the upper polarizing film 9 becomes elliptically polarized light due to the birefringence of the retardation film 17. Since a difference is set between the retardation value of the retardation film 17 and the Δnd value of the liquid crystal device 23, and the pair of polarizing films 8 and 9 are disposed at a most suitable angle, the light returns to the linearly polarized state in the liquid crystal device 23. At this time, if the absorption axis 8a of the lower polarizing film 8 and the absorption axis 9a of the upper polarizing film 9 are disposed in the relation described above, the linearly polarized light does not penetrate through the lower polarizing film 8, resulting in a black display.

Next when voltage is applied between a first electrode 2 and a second electrode 5 of the liquid crystal device 23, molecules of the nematic liquid crystal 7 are activated and the apparent Δnd value of the liquid crystal device is decreased. Therefore, the elliptic polarized light generated at the retardation film 17 does not return to a completely linearly polarized state even after it penetrates through the liquid crystal device 23. Consequently, it reaches the lower polarizing film 8 in a state of elliptical polarization and light having a specific wavelength becomes colored light after penetrating through the lower polarizing film 8.

The colored light that penetrated through the lower polarizing film 8 is reflected by the reflecting plate 11 and emits upward again through the liquid crystal device 23, the retardation film 17 and the upper polarizing film 9, and then performs a negative-type color display.

In the chromaticity diagram shown in FIG. 12, the curved line 32 expressed by a solid line shows the color change when the applied voltage is gradually increased from the state of no voltage applied in the color liquid crystal display of the third embodiment. With no voltage applied, it is black with almost no color, but according to increase of the voltage, it becomes first white, then yellow, red, blue and finally green.

By disposing the absorption axis 8a of the lower polarizing film 8 and the lower molecular alignment direction 7a of the liquid crystal in the liquid crystal device 23 to intersect at an angle of 35 degrees, as shown in FIG. 9, the difference between the wavelength dependency of the difference Δn of birefringence of the liquid crystal device 23 and the wavelength dependency of the retardation value of the retardation film 17 is compensated and a good bright color as well as a good black background color can be obtained.

Especially with a negative-type display having a black background, incident light from surroundings of pixels is also blocked, thus resulting in a dark display. Therefore, a brighter displaying color is preferable.

When the absorption axis 8a of the lower polarizing film 8 and the lower molecular alignment direction 7a of the liquid crystal molecules in the liquid crystal device 23 are disposed to intersect at an angle of less than 35 degrees, a bright displaying color can be obtained, but the black color on the background becomes pale, so that it is therefore preferable to dispose the absorption axis 8a of the lower polarizing film 8 and the lower molecular alignment direction 7a of the liquid crystal in the liquid crystal device 23 to intersect at an angle in a range of 25 to 45 degrees.

In this embodiment, the Δnd value of the liquid crystal device is set to 1680 nm, but by setting it in a range of 1500 nm to 1800 nm, substantially similar effects can be obtained. Even in this case, it is necessary to set the retardation value of the retardation film 17 to be larger than the Δnd value of the liquid crystal device 23 by 50 to 200 nm.

When the Δnd value of the liquid crystal device is set to less than 1500 nm, it is not preferable because the sharpness of the liquid crystal is lowered and high multiplex drive becomes difficult, but this is applicable if a low multiplex drive or an active matrix drive is used. When the Δnd value of the liquid crystal device is set to more than 1800 nn, since the cell gap d is also increased, it is not preferable because the response time of the liquid crystal device is delayed and characteristics of the retardation film 17 are lowered due to various difficulties in production.

When the difference between the retardation value of the retardation film 17 and the Δnd value of the liquid crystal device is less than 50 nm or larger than 200 nm, it is not preferable because black color on the background color becomes pale.

In the present embodiment, the absorption axis 9a of the upper polarizing film 9 is disposed at an angle of 45° counterclockwise to the phase delay axis 17a of the retardation film 17, but when the absorption axis 9a of the upper polarizing film 9 is disposed at an angle of 45° clockwise to the phase delay axis 17a of the retardation film 17, the display becomes white with no voltage applied, and the device becomes a positive display-type color display showing black, blue, green and red with voltage applied.

Additionally, in the present embodiment, an STN (super twisted nematic) liquid crystal device having a 240° twist is used as the liquid crystal device, but similar effects can be obtained when a TN (twisted nematic) liquid crystal device having about a 90° twist or an STN liquid crystal device having more than a 180° twist is used.

By the way, in the present embodiment, since a retardation film made of polycarbonate film is used as the retardation film 17, the retardation value does not change even though the ambient temperature changes, but in a temperature compensating-type retardation film in which liquid crystal molecules are impregnated in the polycarbonate film or a portion of the liquid crystal molecules is connected to open-chain polymer molecules, the retardation value varies according to the temperature change.

When the temperature compensating-type retardation film is used, the retardation value change of the retardation film follows the Δnd value change of the liquid crystal cell caused by any temperature change. As a result, the color change due to temperature on the background color is reduced, so the use of the temperature compensating-type retardation film is more desirable because the range of applicable operating temperatures is increased.

Figure 13:
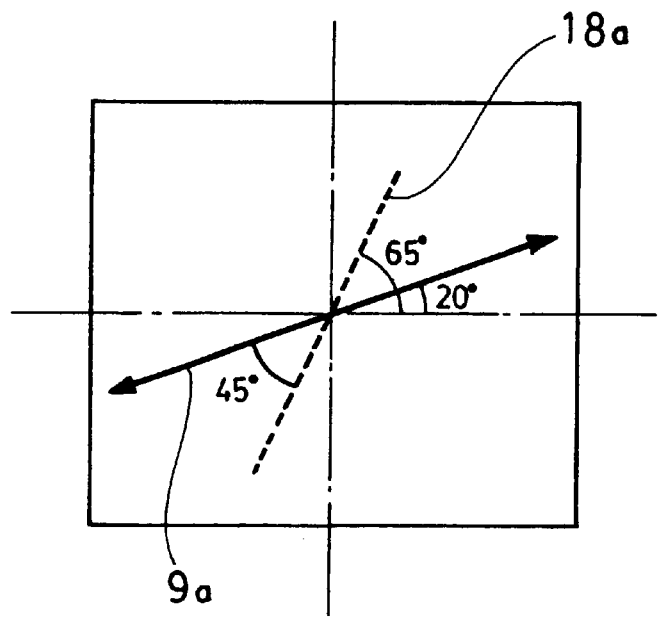
FIG. 13 is a plan view showing a relation between an absorption axis of an upper polarizing film and a phase delay axis of a retardation film, obtained when
Figure 14:
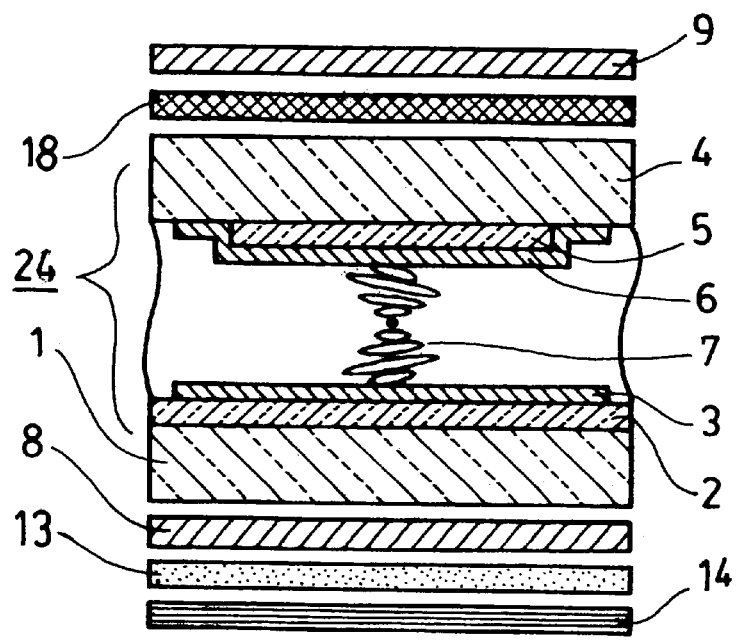
FIG. 14 is viewed from above.
Figure 15:
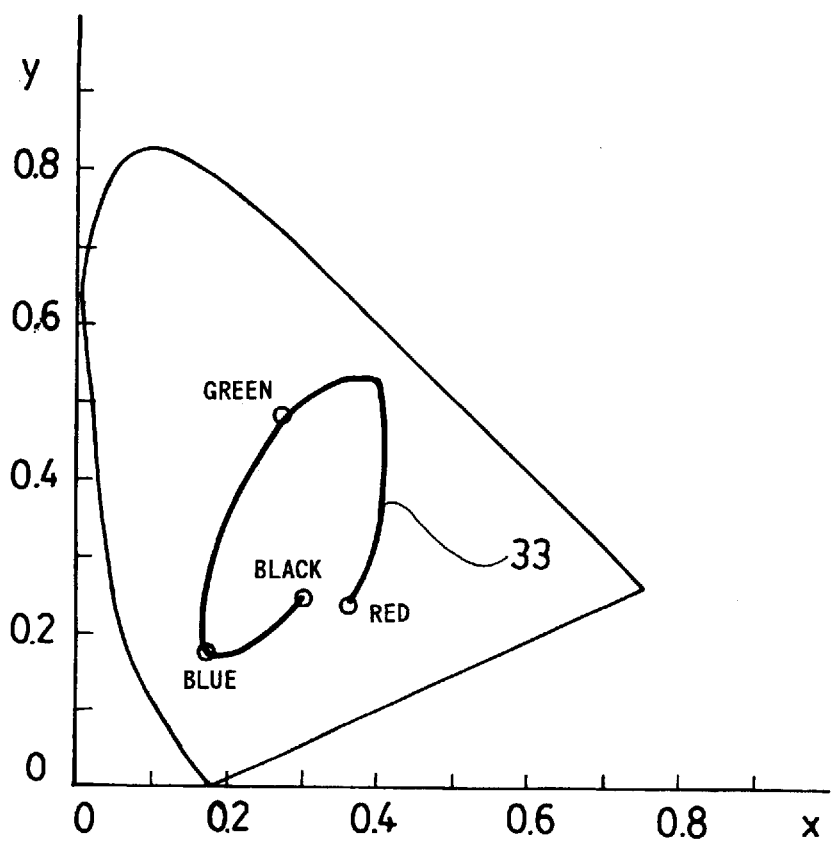
FIG. 15 is a chromaticity diagram explaining changes in color on display images when voltage applied on the liquid crystal device is varied, in the fourth embodiment according to the present invention.

Fourth Embodiment: FIG. 13 to FIG. 15

Next the fourth embodiment of the color liquid crystal display according to the present invention will be explained with reference to FIG. 13 to FIG. 15.

FIG. 14 is a schematic sectional view showing the structure of the color liquid crystal display. FIG. 13 is a top plan view showing the relation between the absorption axis of an upper polarizing film and the phase delay axis of a retardation film, viewed from above. FIG. 15 is a chromaticity diagram of the color liquid crystal display.

Incidentally, since the plan view showing the relation between the absorption axis of the lower polarizing film and the molecular alignment direction of the liquid crystal in the liquid crystal device is the same as FIG. 9, a drawing of the view showing the above relation is omitted. In FIG. 14, portions corresponding to portions in FIG. 7 are given same reference numerals and symbols.

Differences of the color liquid crystal display of the fourth embodiment from the aforementioned color liquid crystal display of the third embodiment are in the Δnd value of the liquid crystal device 24, materials used for the retardation film 18 and its retardation value, the disposition angle of the upper polarizing film 9 and characteristics of the reflecting plate 13. Moreover, it is provided with a back light 14.

The liquid crystal device 24 in the color liquid crystal display has almost a similar configuration as that of the liquid crystal device 22 of the first embodiment explained with reference to FIG. 3. However, the difference Δn of birefringence of the nematic liquid crystal 7 is 0.21 and the cell gap d, that is a space between the first substrate 1 and the second substrate 4, is 7 μm. Therefore the Δnd value of the liquid crystal device expressed by the product of the difference Δn of birefringence of the nematic liquid crystal 7 and the cell gap d is 1470 μm.

The alignment layer 3 of the first substrate 1 is processed by a rubbing treatment parallel with the lower molecular alignment direction 7a in the liquid crystal shown in FIG. 9, and the alignment layer 6 of the second substrate 4 is processed by a rubbing treatment parallel with the upper molecular alignment direction 7b in the liquid crystal. An optically rotating substance called a chiral material is added to the nematic liquid crystal having a viscosity of 20 cp, the twist pitch P is adjusted to 14 μm so that d/P is made to be 0.5 and thus a liquid crystal device having a 240° twist counterclockwise is formed.

The retardation film 18 is a biaxially stretched polycarbonate film and when the refractive index of the phase delay axis 18a, shown in FIG. 13, of the retardation film 18 is taken as nx, the refractive index in the y-axis direction intersecting with the phase delay axis 18a at right angles is taken as ny, and the refractive index in the z-axis direction, that is a thickness direction, is taken as nz, the relation among nx, ny and nz is: nx>nz>ny.

In the biaxial retardation film 18, the amount of change in retardation when the retardation film 18 is slanted around the y-axis is smaller than that in the single-axial retardation film 17 used in the third embodiment. Therefore, the biaxial retardation film 18 is desirable for use in a color liquid crystal display since color change caused by changes of viewing angle are reduced and it has wide viewing angle characteristic.

As shown in FIG. 14, the retardation film 18 is disposed outside of the second substrate 4 of the liquid crystal device 24 and the retardation value is set to 1850 nm. That is, the retardation value of the retardation film 18 is set to be larger than the Δnd value (1470 nm) of the liquid crystal device 24 by 380 nm. The phase delay axis 18a of the retardation film 18 shown in FIG. 13 is disposed at a position deviating from the upper molecular alignment direction 7b of the liquid crystal in the liquid crystal device 24 by 85 degrees (refer to FIG. 9).

The lower polarizing film 8 is disposed outside of the first substrate 1 of the liquid crystal 24, and the upper polarizing film 9 is disposed outside of the retardation film 18. The absorption axis 9a of the upper polarizing film 9 shown in FIG. 13 is disposed 45° clockwise to the phase delay axis 18a of the retardation film 18, the adsorption axis 8a of the lower polarizing film 8 is disposed 35° counterclockwise (refer to FIG. 9) to the lower molecular alignment direction 7a of the liquid crystal in the liquid crystal device 24, and the pair of upper and lower polarizing films 8 and 9 intersect with each other at an angle of 45 degrees.

A transflective reflecting plate 13 is disposed outside of the lower polarizing film 8 and a back light 14 using an EL having white luminescence is disposed outside of the transflective reflecting plate 13.

In the above configuration, the color liquid crystal display of the fourth embodiment serves both as a reflection-type and a translucent-type color liquid crystal display. That is, during daytime hours, it is used as a reflection-type color liquid crystal display, but during nighttime hours when ambient illumination is dark, it can be used as a translucent-type color liquid crystal display, by lighting the back light 14.

In the color liquid crystal display of the present embodiment, when no voltage is applied, linearly polarized light incident from the upper polarizing film 9 becomes elliptic polarized light due to the birefringence of the retardation film 18, but by setting a difference between the retardation value of the retardation film 18 and the Δnd value of the liquid crystal device 24, and by optimizing the intersecting angle of the polarizing films 8 and 9, it returns to linearly polarized light through the liquid crystal device 24.

At this time, if the relation in disposition between the absorption axis 8a of the lower polarizing film 8 and the absorption axis 9a of the upper polarizing film 9 is as above, the linearly polarized light does not penetrate through the lower polarizing film 8, which results in a black display.

When voltage is applied on the liquid crystal device 24, it becomes a negative-type color display emitting blue, green and red color according to the voltage.

The curved line 33 expressed by a solid line in the chromaticity diagram in FIG. 15 shows the change in color when voltage applied to the liquid crystal device 24 is gradually increased from no voltage. It is almost black without color in the no voltage state, but when voltage is applied, it finally displays red through blue and green colors.

By arranging the absorption axis 8a of the lower polarizing film 8 and the lower molecular alignment direction 7a of the liquid crystal in the liquid crystal device 24 to intersect with each other at an angle of 35 degrees, the difference between wavelength dependency of the difference Δn of birefringence of the liquid crystal device and the wavelength dependency of the retardation value of the retardation film 12 is compensated, and a good bright color as well as a good black background can be obtained.

Particularly, in a negative-type display of a black background, since incident light from the surroundings of pixels is blocked, which results in a dark display, a rather bright displaying color is preferable.

When the intersecting angle between the absorption axis 8a of the lower polarizing film 8 and the lower molecular alignment direction 7a in the liquid crystal is made smaller than 35 degrees, the displaying color gets bright but the black color on the background also gets pale. Therefore it is preferable to arrange the intersecting angle between the absorption axis 8a of the lower polarizing film 8 and the lower molecular alignment direction 7a of the liquid crystal to be in a range of 25 degrees to 45 degrees.

In the present embodiment, the Δnd value of the liquid crystal device 24 is set to 1470 nm, but a similar effect can be obtained by setting it in a range of 1300 nm to 1600 mn. Even in such cases, the retardation value of the retardation film 18 needs to be 300 to 500 nm larger than the Δnd value of the liquid crystal device 24.

When the Δnd value of the liquid crystal device 24 is set to be smaller than 1300 nm, it is undesirable because the sharpness deteriorates and high multiplex drive becomes hard to perform, but it is applicable if a low multiplex drive or active matrix drive is used.

When the Δnd value of the liquid crystal device 24 is set to be larger than 1600 nm, it is unfavorable because the final displaying color changes from red to white, and the retardation value of the retardation film 18 becomes more than 1900 nm, and characteristics of the retardation film 18 deteriorate due to various difficulties in production.

When the difference between the retardation value of the retardation film 18 and the Δnd value of the liquid crystal device is smaller than 300 nm or larger than 500 nm, it is unfavorable because the black color on the background gets pale.

Additionally, in the present embodiment, the absorption axis 9a of the upper polarizing film 9 is arranged to have an angle of 45° clockwise to the phase delay axis 18a of the retardation film 18, but when the absorption axis 9a of the upper polarizing film 9 is arranged to have an angle of 45° counterclockwise to the phase delay axis 18a of the retardation film 18, a white display occurs with no voltage applied, and it becomes a positive display-type color display displaying green through yellow and blue when voltage is applied.

The type of liquid crystals applicable to this liquid crystal device is the same as in the cases of each aforementioned embodiment.

The upper polarizing film 9 and the lower polarizing film 8 are made of drawn polyvinyl alcohol (PVA) dyed with iodine and are respectively held between sheets of TAC film, but it is possible to change the displaying color by adopting a color polarizing film, dyed with a dichromatic coloring substance instead of iodine, to any one of the upper or lower polarizing film or as both of them.

Usually, when two sheets of the color polarizing films are arranged parallel, the display becomes almost white, though it shows the pale dyestuff color used in the polarizing film, but when two sheets of color polarizing films are arranged to intersect at right angles, the display clearly shows the dyestuff color. For instance, when two sheets of blue color polarizing films are arranged parallel, a pale bluish white is shown, but when perpendicularly arranged to each other, navy blue is shown.

When the upper polarizing film 9 of the color liquid crystal display of the fourth embodiment is replaced by a blue polarizing film, the display shows navy blue, which is obtainable when color polarizing films perpendicularly intersect, with no voltage applied. However when voltage is applied to the liquid crystal device, the display becomes a negative color display showing blue, bluish green and finally red.

As described above, according to the present invention, a reflection-type color liquid crystal display device producing a bright high-saturation negative-type color display having black or a dark color background can be prepared with the simple configuration of a liquid crystal device, polarizing films and a sheet of retardation films. In addition, by practically applying the color liquid crystal display, display for a colorful digital wristwatch, for example, can be obtained.

What is claimed is:

1. A color liquid crystal display, comprising:
   a liquid crystal device holding a twist-aligned nematic liquid crystal between a pair of substrates made of a first substrate having a first electrode and a second substrate having a second electrode;
   a pair of polarizing films disposed holding said liquid crystal device thereinbetween; and
   a retardation film, which is made by a single axis stretching, disposed between said liquid crystal device and one of said pair of polarizing films, wherein
   an absorption axis of the one of said pair of polarizing films is disposed at a position 45° counterclockwise from a phase delay axis of said retardation film,
   an intersecting angle between an absorption axis of a polarizing film disposed at the opposite side of said retardation film with respect to said liquid crystal device and a lower molecular alignment direction of said liquid crystal in said liquid crystal device is arranged in a range of 35°±10°,
   a Δnd value of said liquid crystal device expressed by a product of a difference Δn of birefringence of said nematic liquid crystal and a space d between said pair of substrates is arranged in a range of 1500 nm to 1800 nm; and
   a retardation value of said retardation film is 50 nm to 200 nm larger than said Δnd value of said liquid crystal device so that a black display results when no voltage is applied.

2. The liquid crystal display according to claim 1, wherein a reflecting plate is provided outside of the polarizing disposed at the opposite side of said retardation film with respect to said liquid crystal device.

3. The liquid crystal display according to claim 1, wherein at least one of said pair of polarizing films is a color polarizing film made by dying with dyestuff.

4. The liquid crystal display according to claim 1, wherein said retardation film is a temperature-compensating retardation film in which a retardation value varies in accordance with temperature.

* * * * *

UNITED STATES PATENT AND TRADEMARK OFFICE
CERTIFICATE OF CORRECTION

PATENT NO.    : 6,169,589 B1
DATED         : January 2, 2001
INVENTOR(S)   : Yasushi Kaneko It is certified that error appears in the above-identified patent and that said Letters Patent is hereby corrected as shown below:

<u>Column 20,</u>
Line 55, change "the polarizing" to be -- the polarizing film --

Signed and Sealed this

Thirtieth Day of April, 2002

Attest:

Attesting Officer

JAMES E. ROGAN
*Director of the United States Patent and Trademark Office*